United States Patent
Tsukamoto

(10) Patent No.: US 10,868,441 B2
(45) Date of Patent: Dec. 15, 2020

(54) POWER TRANSMISSION APPARATUS CONFIGURED TO WIRELESSLY TRANSMIT POWER TO AN ELECTRONIC DEVICE, METHOD OF CONTROLLING POWER TRANSMISSION APPARATUS, AND STORAGE MEDIUM

(71) Applicant: CANON KABUSHIKI KAISHA, Tokyo (JP)

(72) Inventor: Nobuyuki Tsukamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 357 days.

(21) Appl. No.: 15/770,727

(22) PCT Filed: Oct. 12, 2016

(86) PCT No.: PCT/JP2016/004554
§ 371 (c)(1),
(2) Date: Apr. 24, 2018

(87) PCT Pub. No.: WO2017/073023
PCT Pub. Date: May 4, 2017

(65) Prior Publication Data
US 2019/0074717 A1    Mar. 7, 2019

(30) Foreign Application Priority Data

Oct. 29, 2015   (JP) .................. 2015-213097

(51) Int. Cl.
*H01M 10/46* (2006.01)
*H02J 50/10* (2016.01)
(Continued)

(52) U.S. Cl.
CPC .............. *H02J 50/10* (2016.02); *H02J 50/80* (2016.02); *H04B 5/0031* (2013.01); *H04B 5/0037* (2013.01)

(58) Field of Classification Search
CPC ...... H02J 7/0021; H02J 7/0034; H02J 7/0063; H02J 2007/0067; H02J 7/007; H02J 50/10;
(Continued)

(56) References Cited

U.S. PATENT DOCUMENTS

2013/0285618 A1   10/2013   Iijima et al.
2014/0015478 A1    1/2014   Von Novak
(Continued)

FOREIGN PATENT DOCUMENTS

CN   104937811 A   9/2015
EP   2800423 A2    11/2014
(Continued)

*Primary Examiner* — Edward Tso
(74) *Attorney, Agent, or Firm* — Canon U.S.A., Inc. I.P. Division

(57) ABSTRACT

A power transmission apparatus includes a power transmission unit configured to contactlessly transmit power to an electronic device, a communication unit configured to communicate with the electronic device, and a control unit, wherein the control unit acquires information on a power level receivable by the electronic device via the communication unit, wherein in a case where an instruction for increasing or reducing the power transmitted from the power transmission unit is received from the electronic device via the communication unit, the control unit changes the power transmitted from the power transmission unit, and wherein an amount of the power changed by the control unit at a time according to the instruction varies depending on the power level receivable by the electronic device.

15 Claims, 10 Drawing Sheets

(51) Int. Cl.
*H02J 50/80* (2016.01)
*H04B 5/00* (2006.01)

(58) Field of Classification Search
CPC ........ H02J 50/20; H02J 50/80; H04B 5/0037; H04B 5/0031
USPC ................ 320/127, 128, 135, 108; 307/104; 455/572, 573, 574; 713/300
See application file for complete search history.

(56) References Cited

U.S. PATENT DOCUMENTS

| | | |
|---|---|---|
| 2015/0097442 A1 | 4/2015 | Muurinen |
| 2015/0180240 A1 | 6/2015 | Kwon et al. |
| 2015/0301587 A1* | 10/2015 | Chae ........................ G06F 1/324 713/323 |
| 2016/0165552 A1* | 6/2016 | Narang ................ H04W 4/025 370/311 |
| 2019/0207409 A1* | 7/2019 | Akiyoshi ................ H02J 7/027 |

FOREIGN PATENT DOCUMENTS

| | | |
|---|---|---|
| JP | 2010063245 A | 3/2010 |
| JP | 2011-152008 A | 8/2011 |
| JP | 2013-138591 A | 7/2013 |
| JP | 2014-023223 A | 2/2014 |
| JP | 2014-138547 A | 7/2014 |
| KR | 10-2014-0133473 A | 11/2014 |

* cited by examiner

POWER TRANSMISSION APPARATUS CONFIGURED TO WIRELESSLY TRANSMIT POWER TO AN ELECTRONIC DEVICE, METHOD OF CONTROLLING POWER TRANSMISSION APPARATUS, AND STORAGE MEDIUM

TECHNICAL FIELD

The present disclosure relates to a power transmission apparatus configured to wirelessly transmit power to an electronic device, a method of controlling a power transmission apparatus, and a storage medium.

BACKGROUND ART

In recent years, a wireless power transmission system has been known which includes a power transmission apparatus configured to contactlessly transmit power without using a connector for connection, and an electronic device configured to charge a mounted battery using the power transmitted from the power transmission apparatus. In such a contactless wireless power transmission system, it is known to configure the power transmission apparatus so as to transmit power to the electronic device using an electromagnetic induction phenomenon (PTL 1). It is known to configure the power transmission apparatus so as to be capable of selecting a particular electronic device as a power transmission destination from a plurality of electronic devices. However, the power transmission apparatus does not control the magnitude of transmission power depending on the electronic device to which the power is transmitted, and thus the power transmission apparatus is not capable of properly determining the power to be transmitted to the electronic device. Therefore, there is a possibility that an excessive amount of power transmission may adversely affect the electronic device to which the power is transmitted.

CITATION LIST

Patent Literature

PTL 1: Japanese Patent Laid-Open No. 2010-63245

SUMMARY OF INVENTION

In an aspect, the present disclosure provides a power transmission apparatus including a power transmission unit configured to contactlessly transmit power to an electronic device, a communication unit configured to communicate with the electronic device, and a control unit, wherein the control unit acquires information on a power level receivable by the electronic device via the communication unit, wherein in a case where an instruction for increasing or reducing the power transmitted from the power transmission unit is received from the electronic device via the communication unit, the control unit changes the power transmitted from the power transmission unit, and wherein an amount of the power changed by the control unit at a time according to the instruction varies depending on the power level receivable by the electronic device.

Further features of the present invention will become apparent from the following description of exemplary embodiments with reference to the attached drawings.

DESCRIPTION OF EMBODIMENTS

The present invention is described below with reference to embodiments in conjunction with drawing. Note that the present invention is not limited to those embodiments described below.

First Embodiment

Figure 1:
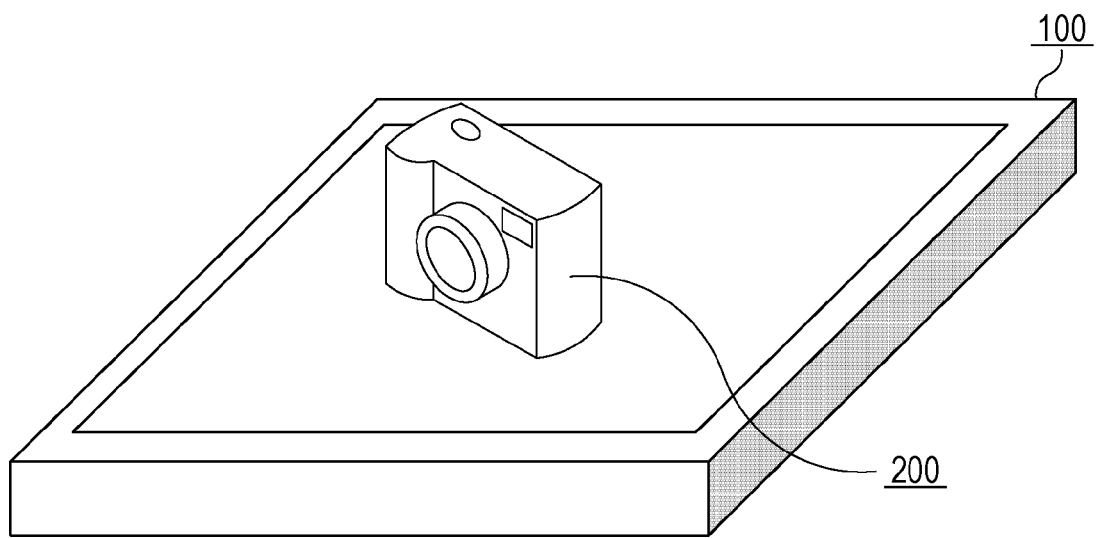
FIG. 1 is a diagram illustrating an example of a wireless power transmission system according to a first embodiment.

In a first embodiment, as illustrated in FIG. 1, a wireless power transmission system includes a power transmission apparatus 100 and an electronic device 200. In the wireless power transmission system according to the first embodiment, when the distance between the power transmission apparatus 100 and the electronic device 200 is within a predetermined range, the power transmission apparatus 100 may wirelessly transmit power to the electronic device 200.

When the electronic device 200 exists within a predetermined range from the power transmission apparatus 100, the electronic device 200 is capable of wirelessly receiving power output from the power transmission apparatus 100. However, when the electronic device 200 does not exist within the predetermined range from the power transmission apparatus 100, the electronic device 200 is not capable of receiving power from the power transmission apparatus 100. Herein, the predetermined range is a range in which the power transmission apparatus 100 and the electronic device 200 are capable of communicating with each other. In the first embodiment, it is assumed by way of example but not limitation that the predetermined range is a range covering a housing of the power transmission apparatus 100. The power transmission apparatus 100 may be configured to be capable of wirelessly transmitting power to a plurality of electronic devices.

The electronic device 200 may be an image capturing apparatus such as a camera or the like, or a playback apparatus configured to play audio data, image data, or the like. The electronic device 200 may be a communication apparatus such as a portable telephone, a smartphone, or the like. The electronic device 200 may be a battery pack including a battery. The electronic device 200 may be an apparatus such as a vehicle driven by power supplied from the power transmission apparatus 100. The electronic device 200 may an apparatus configured to receive a television broadcast program, a display configured to display image data, a personal computer, or the like. The electronic device 200 may be an apparatus configured to be capable of operating using power supplied from the power transmission apparatus 100 even in a state in which no battery is mounted on the apparatus.

Figure 2:
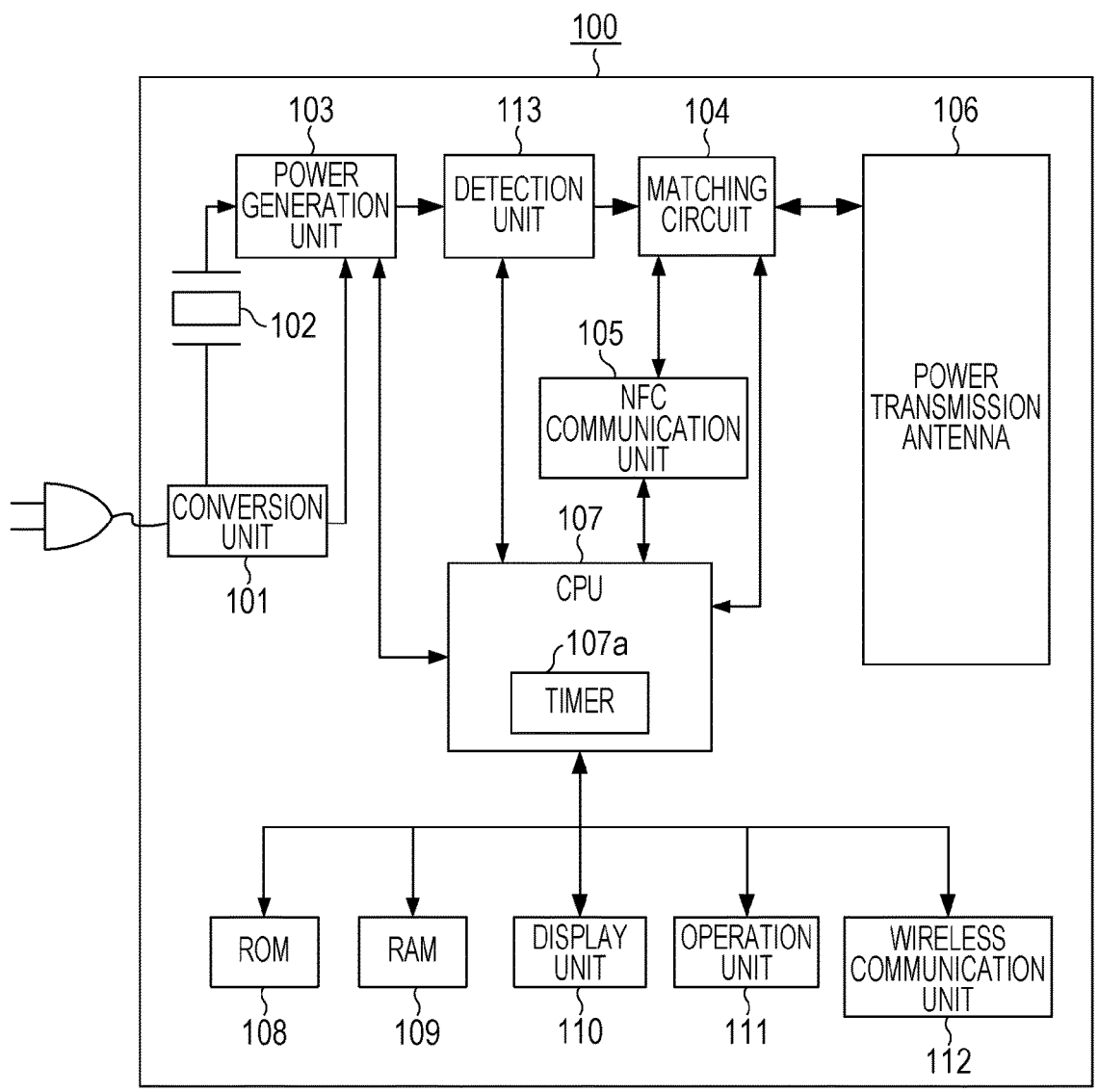
FIG. 2 is a block diagram illustrating an example of a set of constituent elements of a power transmission apparatus.

FIG. 2 is a block diagram illustrating an example of a set of constituent elements of the power transmission apparatus 100. The power transmission apparatus 100 includes, as shown in FIG. 2, a conversion unit 101, an oscillator 102, a power generation unit 103, a matching circuit 104, an NFC communication unit 105, a power transmission antenna 106, and a central processing unit (CPU) 107. The power transmission apparatus 100 further includes a ROM 108, a RAM 109, a display unit 110, an operation unit 111, a wireless communication unit 112, and a detection unit 113.

In a case where the power transmission apparatus 100 is connected to an AC power supply (not illustrated), the conversion unit 101 converts AC power supplied from this AC power supply to DC power and supplies the converted DC power to the power transmission apparatus 100.

The oscillator 102 oscillates a frequency used to control the power generation unit 103 such that the power supplied from the conversion unit 101 is equal to a target value of power set by the CPU 107. Note that the oscillator 102 may be a crystal oscillator or the like.

The power generation unit 103 generates power to be output to the outside via the power transmission antenna 106, based on the power supplied from the conversion unit 101 and the frequency oscillated by the oscillator 102. The power generation unit 103 internally includes an amplifier or the like to generate power to be output to the outside depending on the frequency oscillated by the oscillator 102. Note that the power generated by the power generation unit 103 is supplied to the matching circuit 104 via the detection unit 113.

Note that the power generation unit 103 generates two types of power, that is, communication power and transmission power. The power transmission apparatus 100 performs wireless communication between the power transmission apparatus 100 and the electronic device 200 based on the Near Field Communication (NFC) standard. The communication power is power that is supplied to the electronic device 200 to allow the power transmission apparatus 100 to perform wireless communication according to the NFC standard (NFCIP-1 (ISO/IEC 18092) or NFCIP-2 (ISO/IEC 21481)). On the other hand, the transmission power is power that is supplied from the power transmission apparatus 100 to the electronic device 200 to allow the electronic device 200 to charge the battery 212. The communication power is equal to or smaller than, for example, 1 W, while the transmission power is equal to or greater than, for example, 1 W.

The communication power may be lower than the transmission power. Note that the communication power does not necessarily need to be equal to or lower than 1 W as long as it is used by the power transmission apparatus 100 to perform wireless communication according to the NFC standard, and the transmission power does not necessarily need to be equal to or greater than 1 W as long as it is used by the power transmission apparatus 100 to allow the electronic device 200 to perform charging. The CPU 107 is capable of adjusting the transmission power by changing the voltage of the amplifier of the power generation unit 103 thereby changing the power generated by the power generation unit 103.

Figure 4:
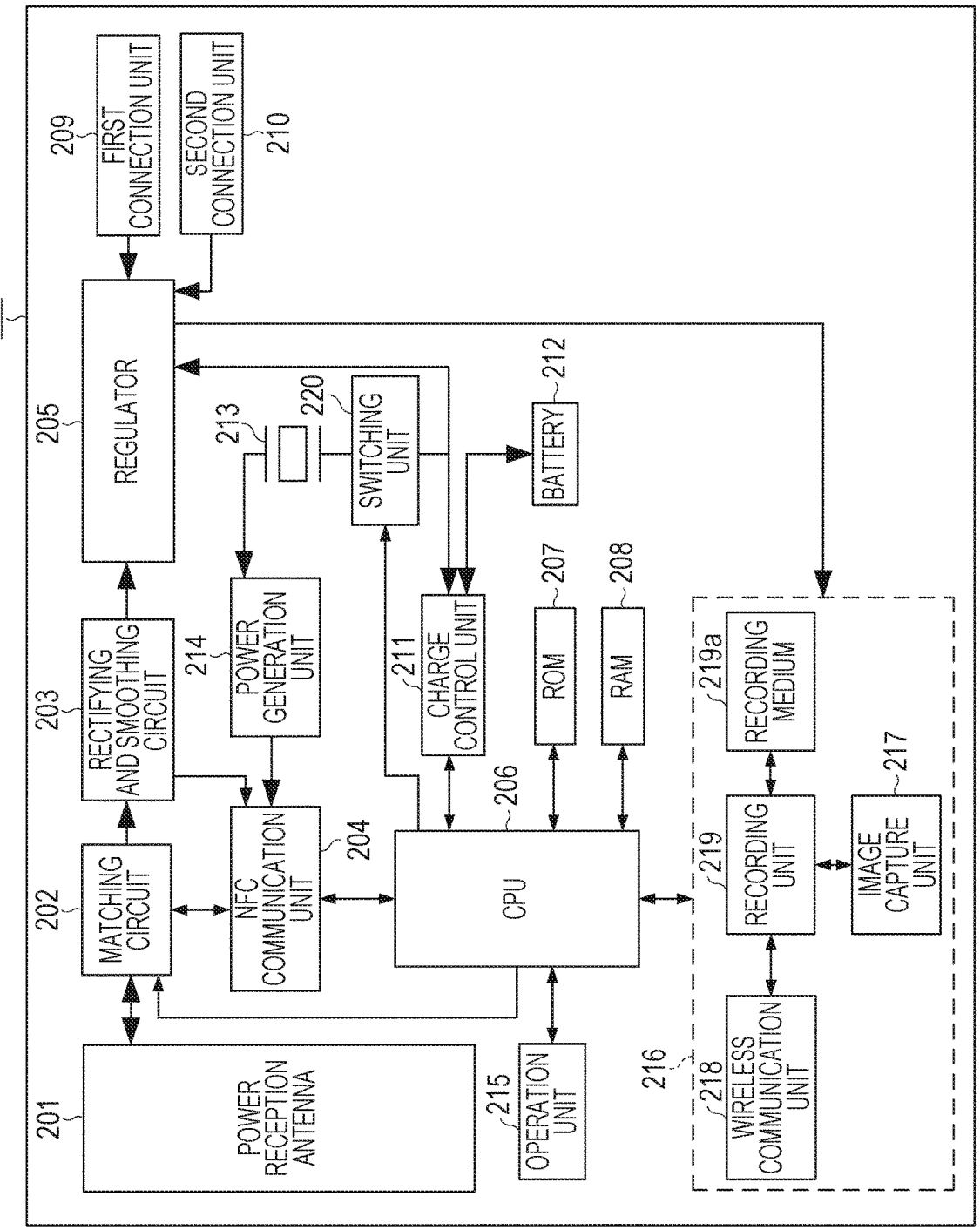
FIG. 4 is a block diagram illustrating an example of a set of constituent elements of an electronic device.

The matching circuit 104 is a resonance circuit that allows resonance to occur between the power transmission antenna 106 and the power reception antenna 201 of the electronic device 200 shown in FIG. 4. The matching circuit 104 includes a circuit for achieving impedance matching between the power generation unit 103 and the power transmission antenna 106. The matching circuit 104 includes a coil (not illustrated) and a capacitor (not illustrated).

In a case where the power transmission apparatus 100 outputs either one of the communication power and the transmission power, the CPU 107 controls the resonance frequency f of the power transmission antenna 106 so as to be equal to a particular frequency to achieve resonance between the power transmission antenna 106 and the power reception antenna 201 of the electronic device 200. More specifically, the CPU 107 changes the resonance frequency f of the power transmission antenna 106 by controlling a value of inductance included in the matching circuit 104 and a value of capacitance included in the matching circuit 104. The particular frequency is a frequency used in performing wireless communication according to the NFC standard between the power transmission apparatus 100 and the electronic device 200. Note that the particular frequency is also a frequency at which resonance occurs between the power transmission apparatus 100 and the electronic device 200. The particular frequency may be, for example, 13.56 MHz.

The matching circuit 104 is capable of detecting a current flowing through the power transmission antenna 106 and detecting a voltage supplied to the power transmission antenna 106. The matching circuit 104 notifies the CPU 107 of the detected value of the current of the power transmission antenna 106 and the detected value of the voltage of the power transmission antenna 106. Furthermore, the matching circuit 104 notifies the NFC communication unit 105 of the detected value of the current of the power transmission antenna 106.

In a case where the resonance frequency f of the power transmission antenna 106 is 13.56 MHz, the NFC communication unit 105 performs wireless communication according to the NFC standard. In a case where the resonance frequency f of the power transmission antenna 106 is 13.56 MHz and the power transmission apparatus 100 is supplying communication power to the electronic device 200, the NFC communication unit 105 is capable of performing wireless communication according to the NFC standard with the electronic device 200 via the power transmission antenna 106. On the other hand, in a case where the frequency oscillated by the oscillator 102 is 13.56 MHz and the power transmission apparatus 100 is supplying transmission power to the electronic device 200, the NFC communication unit 105 is not capable of performing wireless communication according to the NFC standard with the electronic device 200 via the power transmission antenna 106.

The NFC communication unit 105 superimposes a command on communication power and transmits it to the electronic device 200 via the power transmission antenna 106. In this process, to generate a pulse signal corresponding to the command to be transmitted to the electronic device 200, the NFC communication unit 105 performs ASK (Amplitude Shift Keying) modulation, based on an NFC standard protocol, on the communication power generated by the power generation unit 103. The ASK modulation is performed using amplitude displacement, and is used in communication between an IC card and a card reader. Thereafter, the NFC communication unit 105 transmits the generated pulse signal representing the command to the electronic device 200 via the power transmission antenna 106.

The electronic device 200 analyzes the pulse signal received from the power transmission apparatus 100 to acquire bit data including information of "1" and information of "0", and performs a process indicated by the bit data. In response to receiving the command from the power transmission apparatus 100, the electronic device 200 modulates a load included in the electronic device 200 thereby transmitting response data corresponding to the received command to the power transmission apparatus 100. When the load is modulated in the electronic device 200, a change occurs in a current flowing through the power transmission antenna 106. Therefore, the NFC communication unit 105 is capable of receiving the response data from the electronic device 200 by demodulating, using a demodulation circuit (not illustrated) in the NFC communication unit 105, the value of the current flowing through the power transmission antenna 106 supplied from the matching circuit 104.

The power transmission antenna 106 is an antenna for outputting power generated by the power generation unit 103 to the outside. The power transmission apparatus 100 is capable of supplying power to the electronic device 200 via the power transmission antenna 106 and transmitting a command to the electronic device 200 via the power transmission antenna 106. Furthermore, the power transmission apparatus 100 is capable of receiving, from the electronic device 200 via the power transmission antenna 106, a command and response data corresponding to the command transmitted from the electronic device 200.

The CPU 107 controls the power transmission apparatus 100 by executing a computer program stored in the ROM 108. The CPU 107 controls power supplied to the electronic device 200 by controlling the power generation unit 103. The CPU 107 includes a timer 107a configured to measure a time elapsed since the start of the outputting of the communication power.

The ROM 108 stores the computer program for controlling the power transmission apparatus 100 and information such as a parameter associated with the power transmission apparatus 100. The RAM 109 is a rewritable memory, in which a computer program for controlling the power transmission apparatus 100, information such as a parameter associated with the power transmission apparatus 100, data received from the electronic device 200 via the NFC communication unit 105, and the like are stored.

The display unit 110 displays image data supplied from one of the RAM 109 and the ROM 108. The operation unit 111 provides a user interface for operating the power transmission apparatus 100. The operation unit 111 includes a power button of the power transmission apparatus 100, a mode switching button of the power transmission apparatus 100, and the like, wherein each button is realized using a switch, a touch panel, or the like. The CPU 107 controls the power transmission apparatus 100 according to an input signal given via the operation unit 111.

The wireless communication unit 112 performs wireless communication different from the wireless communication according to the NFC standard. More specifically, the wireless communication unit 112 performs wireless communication over a communication range longer than that supported in the wireless communication according to the NFC standard, and the wireless communication unit 112 performs the wireless communication using a frequency band different from that used in the wireless communication according to the NFC standard. More specifically, for example, the wireless communication unit 112 performs wireless communication according to a wireless LAN (Local Area Network) standard.

Figure 3:
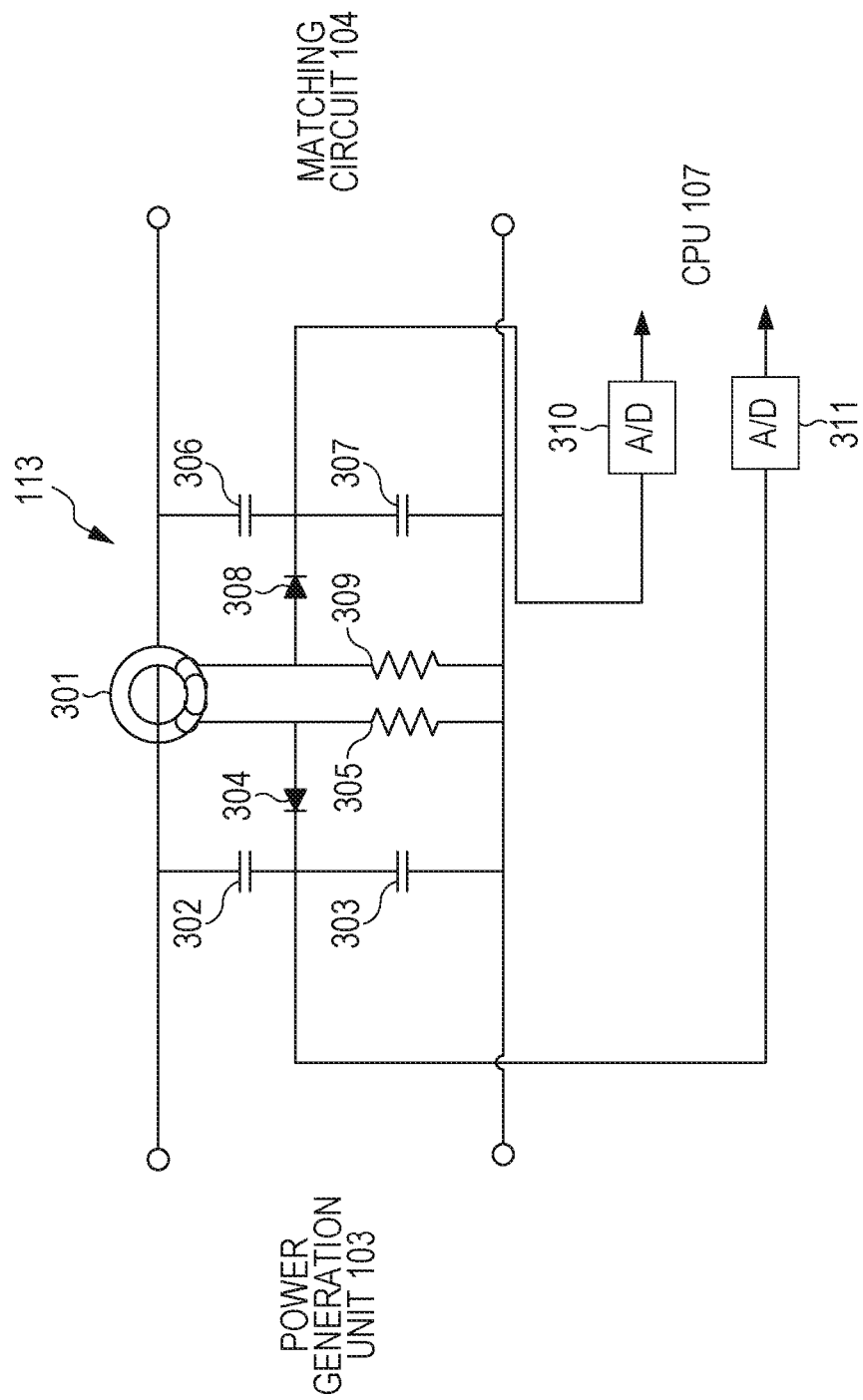
FIG. 3 is a diagram illustrating an example of a detailed configuration of a detection unit.

Next, the detection unit 113 shown in FIG. 2 is described in further detail below. FIG. 3 illustrates an example of a configuration of the detection unit 113. The detection unit 113 includes, as shown in FIG. 3, a toroidal core 301, capacitors 302 and 303, a diode 304, a resistor 305, capacitors 306 and 307, a diode 308, and a resistor 309. Furthermore, the detection unit 113 includes analog-to-digital converters 310 and 311.

The detection unit 113 detects a travelling wave of power output from the power transmission antenna 106 as a voltage across the capacitor 307 occurring via CM (capacitive and inductive) coupling. Furthermore, the detection unit 113 converts the detected voltage of the capacitor 307 from an analog value to a digital value using the analog-to-digital converter 310, and supplies the resultant value to the CPU 107. Furthermore, the detection unit 113 detects a reflected wave of power output from the power transmission antenna 106 as a voltage across the capacitor 303 occurring via CM coupling. Furthermore, the detection unit 113 converts the detected voltage of the capacitor 303 from an analog value to a digital value using the analog-to-digital converter 311, and supplies the resultant value to the CPU 107.

Note that in the detection unit 113 the inductive coupling is accomplished by the toroidal core 301, while the capacitive coupling is accomplished by the capacitors 302 and 306. The CPU 107 detects the voltage supplied from the analog-to-digital converter 310 as an amplitude voltage V1 of the travelling wave, and detects the voltage supplied from the analog-to-digital converter 311 as an amplitude voltage V2 of the travelling wave. The CPU 107 determines the voltage reflection coefficient ρ from the amplitude voltage V1 of the travelling wave and the amplitude voltage V2 of the reflected wave. Furthermore, the CPU 107 periodically calculates a voltage standing wave ratio VSWR from the voltage reflection coefficient ρ.

The voltage standing wave ratio VSWR is a value indicating a relationship between the travelling wave of the power output from the power transmission antenna 106 and the reflected wave of the power output from the power transmission antenna 106. As the value of the voltage standing wave ratio VSWR is closer to 1, the reflected power is lower, that is, the power is supplied from the power transmission apparatus 100 to an external electronic device in a highly efficient manner with a small loss. The voltage reflection coefficient ρ is given by formula (1) shown below, and the voltage standing wave ratio VSWR is given by formula (2).

$$\rho = V2/V1 \quad (1)$$

$$VSWR = (1+\rho)/(1-\rho) \quad (2)$$

Hereinafter, the voltage standing wave ratio VSWR will be referred to simply as VSWR. The CPU 107 is capable of detecting whether there is a non-target object close to the power transmission apparatus 100 according to the calculated VSWR. Furthermore, the CPU 107 is capable of detecting whether the electronic device 200 exists close to the power transmission apparatus 100 according to the calculated VSWR.

Next, referring to FIG. 4, an example of a configuration of the electronic device 200 is described below. FIG. 4 is a block diagram illustrating an example of a set of constituent elements of the electronic device 200. The electronic device 200 includes, as shown in FIG. 4, a power reception antenna 201, a matching circuit 202, a rectifying-and-smoothing circuit 203, an NFC communication unit 204, a regulator 205, a CPU 206, a ROM 207 and a RAM 208. Furthermore, the electronic device 200 also includes a first connection unit 209, a second connection unit 210, a charge control unit 211, a battery 212, an oscillator 213, a power generation unit 214, an operation unit 215, an image processing unit 216 and a switching unit 220.

The power reception antenna 201 is an antenna for receiving power supplied from the power transmission apparatus 100. The electronic device 200 is allowed to receive power from the power transmission apparatus 100 via the power reception antenna 201 or perform wireless communication with the power transmission apparatus 100 according to the NFC standard via the power reception antenna 201. In a case where the electronic device 200 receives a command from the power transmission apparatus 100 via the power reception antenna 201, the electronic device 200 transmits, to the power transmission apparatus 100, response data corresponding to the command received from the power transmission apparatus 100.

The matching circuit 202 is a resonance circuit for providing resonance between the power transmission antenna 106 and the power reception antenna 201 at the same frequency as the resonance frequency f of the power transmission antenna 106. The matching circuit 202 includes a circuit for achieving impedance matching between the power reception antenna 201 and the rectifying-and-smoothing circuit 203. The matching circuit 202 includes a not-illustrated coil and a not-illustrated capacitor. The CPU 206 controls the value of the inductance of the coil and the value of the capacitance of the capacitor included in the matching circuit 202 such that the power reception antenna 201 has resonance at the same frequency as the resonance frequency f of the power transmission antenna 106. Furthermore, the matching circuit 202 supplies power received via the power reception antenna 201 to the rectifying-and-smoothing circuit 203.

The rectifying-and-smoothing circuit 203 removes the command and noise from the power supplied from the matching circuit 202 thereby generating DC power. The rectifying-and-smoothing circuit 203 supplies the generated DC power to the regulator 205. The rectifying-and-smoothing circuit 203 supplies the command extracted from the power received via the power reception antenna 201 to the NFC communication unit 204.

The NFC communication unit 204 performs wireless communication according to the NFC standard. The NFC communication unit 204 analyzes the command supplied from the rectifying-and-smoothing circuit 203 according to the protocol of the NFC standard, and supplies a result of the analysis on the command to the CPU 206. In a case where communication power is being supplied to the electronic device 200 from the power transmission apparatus 100, the CPU 206 transmits response data in response to the received command to the power transmission apparatus 100. In this case, to transmit the response data in response to the received command to the power transmission apparatus 100, the CPU 206 controls the NFC communication unit 204 so as to vary the load in the NFC communication unit 204. The response data is stored, in the ROM 207 or the RAM 208, in the NDEF (NFC. Data Exchange Format) format according to the NFC forum standard. Types of the response data include NDEF message information for authentication, status exchange NDEF message information, and the like.

The NDEF message information for authentication is information transmitted when device authentication is performed between the power transmission apparatus 100 and the electronic device 200. Details of the NDEF message information for authentication will be described later. In a case where transmission power is being supplied to the electronic device 200 from the power transmission apparatus 100, the CPU 206 transmits, via the NFC communication unit 204, the status exchange NDEF message information at predetermined intervals to the power transmission apparatus 100. The status exchange NDEF message information is information for adjusting the transmission power at the side of the power transmission apparatus 100. The status exchange NDEF message information is updated depending on the state of the electronic device 200. For example, the CPU 206 refers to information associated with the battery 212 supplied from the charge control unit 211, information indicating the temperature of the electronic device 200, or the like, and the CPU 206 updates the status exchange NDEF message information depending on the information. Details of the status exchange NDEF message information will be described later.

The regulator 205 performs control such that power is supplied to the electronic device 200 from one of the following: the rectifying-and-smoothing circuit 203; the battery 212; the first connection unit 209; and the second connection unit 210. Under the control of the CPU 206, the regulator 205 supplies, to the electronic device 200, the power supplied from the power transmission apparatus 100 via the rectifying-and-smoothing circuit 203. Under the control of the CPU 206, the regulator 205 supplies, to the electronic device 200, the power supplied from the battery 212 via the charge control unit 211. Under the control of the CPU 206, the regulator 205 supplies, to the electronic device 200, the power supplied from the first connection unit 209. Under the control of the CPU 206, the regulator 205 supplies, to the electronic device 200, the power supplied from the second connection unit 210.

According to the result of the analysis on the command supplied from the NFC communication unit 204, the CPU 206 determines which one of commands has been received via the NFC communication unit 204, and controls the electronic device 200 such that the electronic device 200 performs a process or an operation specified by the received command. The CPU 206 controls the electronic device 200 by executing a computer program stored in the ROM 207. The CPU 206 is capable of receiving a result of a measurement performed by a temperature detection unit (not illustrated) to acquire information on the temperature of the electronic device 200.

The ROM 207 stores a computer program for controlling the electronic device 200 and information associated with the electronic device 200. The RAM 208 is a rewritable memory, and is used to store a computer program for controlling the electronic device 200 data transmitted from the power transmission apparatus 100, and the like.

The first connection unit 209 includes a terminal for connecting to a commercial power supply (not illustrated). In a case where the first connection unit 209 is connected to a commercial power supply, the first connection unit 209 detects that the electronic device 200 is connected to the commercial power supply. On the other hand, in a case where the first connection unit 209 is not connected to a commercial power supply, the first connection unit 209 detects that the electronic device 200 is not connected to a commercial power supply. In the case where the first connection unit 209 is connected to a commercial power supply, the first connection unit 209 converts AC power supplied from the commercial power supply to DC power and supplies the converted DC power to the regulator 205.

The second connection unit 210 includes a terminal for connecting to an external power supply apparatus. In the first embodiment, it is assumed by way of example that the second connection unit 210 is connected to an external power supply apparatus via a USB (Universal Serial Bus) cable. In this case, the external power supply apparatus is a host device capable of supplying power to the electronic device 200 via the USB cable, and an example of such a host device is a personal computer.

In a case where the second connection unit 210 is connected to the external power supply apparatus via the USB cable, the second connection unit 210 detects that the electronic device 200 is connected to the external power supply apparatus. In a case where the second connection unit 210 is not connected to the external power supply apparatus via the USB cable, the second connection unit 210 detects that the electronic device 200 is not connected to the external power supply apparatus. In the case where the second connection unit 210 is connected to the external power supply apparatus, the second connection unit 210 supplies, to regulator 205, the power supplied from the external power supply apparatus.

In a case where power from one of the rectifying-and-smoothing circuit 203, the first connection unit 209, and the second connection unit 210 is supplied via the regulator 205, the charge control unit 211 charges the battery 212 using the power supplied from the regulator 205. On the other hand, in a case where power is discharged from the battery 212, the charge control unit 211 supplies discharging power supplied from the battery 212 to the regulator 205. The charge control unit 211 periodically detects information indicating the remaining charge of the battery 212 and information associated with the charging of the battery 212, and notifies the CPU 206 of the detected information.

The battery 212 is a battery removably mounted on the electronic device 200. The battery 212 is a rechargeable secondary battery, such as a lithium-ion battery or the like. Note that the battery 212 may be a battery of a type other than lithium-ion battery.

The oscillator 213 oscillates a frequency for use in controlling the power generation unit 214 such that the power supplied from the regulator 205 via the switching unit 220 is converted to a target value of power set by the CPU 206. As for the oscillator 213, a crystal oscillator or the like is used.

The power generation unit 214 generates power to be output to the outside via the power reception antenna 201, based on the power supplied from the regulator 205 and the frequency oscillated by the oscillator 213. The power generation unit 214 internally includes a FET and the like to generate power to be output to the outside depending on the frequency oscillated by the oscillator 213. The power generated by the power generation unit 214 is supplied to the NFC communication unit 204. Note that the power generated by the power generation unit 103 is communication power.

Note that in a case where any command defined in the NFC standard is not transmitted from the electronic device 200 to the power transmission apparatus 100, the CPU 206 controls the switching unit 220 such that the oscillator 213 and the regulator 205 are not connected to each other, and stops the operation of the power generation unit 214. On the other hand, in a case where a command defined in the NFC standard is transmitted from the electronic device 200 to the power transmission apparatus 100, the CPU 206 controls the switching unit 220 such that the oscillator 213 and the regulator 205 are connected to each other, and starts the operation of the power generation unit 214. In this case, the NFC communication unit 204 superimposes the command on the communication power supplied from the power generation unit 214 and transmits the command superimposed on the communication power to the power transmission apparatus 100 via the power reception antenna 201.

The operation unit 215 is a user interface for operating the electronic device 200. The operation unit 215 includes a power button for operating the electronic device 200 and a mode switching button for switching the mode of the electronic device 200, wherein each button is realized using a switch, a touch panel, or the like. When the operation unit 215 is operated by a user, the operation unit 215 supplies a signal corresponding to the operation performed by the user to the CPU 206. Note that the operation unit 215 may be an operation unit configured to control the electronic device 200 in accordance with a remote control signal received from a remote control (not illustrated).

The image processing unit 216 includes an image capture unit 217, a wireless communication unit 218, and a recording unit 219. The image capture unit 217 includes an image sensing device for generating image data from an optical image of an object, an image processing circuit configured to perform image processing on the image data generated by the image sensing device, and a compression/decompression circuit for compressing the image data and decompressing the compressed image data, and the like. The image capture unit 217 captures an image of an object and supplies image data of a still image, a moving image, or the like obtained as a result of the capturing to the recording unit 219. The recording unit 219 records, in a recording medium 219a, the image data supplied from the image capture unit 217. The image capture unit 217 may further include another element for use in capturing an image of an object.

The wireless communication unit 218 is capable of transmitting image data and audio data recorded in the ROM 207 or the recording medium 219a to the power transmission apparatus 100 and receiving image data and audio data from the power transmission apparatus 100. Furthermore, the wireless communication unit 218 transmits and receives image data and audio data according to a communication protocol which is common to the wireless communication unit 112. For example, the wireless communication unit 218 performs wireless communication according to the wireless LAN standard as with the wireless communication unit 112.

The recording unit 219 records, in the recording medium 219a, data such as image data, audio data, or the like supplied from one of the wireless communication unit 218 and the image capture unit 217. The recording unit 219 is also capable of reading data such as image data, audio data, or the like from the recording medium 219a and supplying it to one of the RAM 208 and the wireless communication unit 218. Note that the recording medium 219a may be a hard disk, a memory card, or the like, and the recording medium 219a may be installed in the electronic device 200 or the recording medium 219a may be an external storage medium removably mounted on the electronic device 200.

Note that the image processing unit 216 includes a unit that receives power from the regulator 205 when the power of the electronic device 200 is in an ON-state, and thus the image processing unit 216 may further include a display unit for displaying image data, a unit for performing mail transmission/reception, or the like in addition to the image capture unit 217, the wireless communication unit 218, the recording unit 219, and the recording medium 219a.

The switching unit 220 includes a switch for connecting the oscillator 213 and the regulator 205 to each other. In a case where the switching unit 220 is in the ON-state, the oscillator 213 and the regulator 205 are connected to each other. In a case where the switching unit 220 is not in the ON-state, the oscillator 213 and the regulator 205 are not connected to each other. The CPU 206 controls the switching unit 220 to be in the OFF or ON state depending on whether a command defined in the NFC standard is transmitted or not.

The power transmission antenna 106 and the power reception antenna 201 each may be a loop antenna or a panel antenna such as a meander line antenna or the like.

In the first embodiment, it is assumed by way of example but not limitation that the power transmission apparatus 100 uses magnetic resonance method in performing wireless power transmission to the electronic device 200. For example, instead of the magnetic resonance method, the power transmission apparatus 100 may use electric field coupling in performing wireless power transmission to the electronic device 200. In this case, the power transmission apparatus 100 and the electronic device 200 each need to have an electrode such that power is wirelessly supplied from the electrode of the power transmission apparatus 100 to the electrode of the electronic device 200.

Alternatively, for example, instead of using the magnetic resonance method, the power transmission apparatus 100 may use electromagnetic induction in performing wireless power transmission to the electronic device 200. Alternatively, for example, instead of using the magnetic resonance method, the power transmission apparatus 100 may perform wireless power transmission to the electronic device 200 based on the standard (Qi standard) defined in WPC (Wireless Power Consortium). Alternatively, for example, instead of using the magnetic resonance method, the power transmission apparatus 100 may perform wireless power transmission to the electronic device 200 based on the standard defined in CEA (Consumer Electronics Association). Note that the term "wirelessly" used in the context "the power transmission apparatus 100 wirelessly supplies power to the electronic device 200" may be replaced with "contactlessly" or "without contacts".

In the first embodiment, it is assumed that the power transmission apparatus 100 performs wireless communication with the electronic device 200 according to the NFC standard. To achieve this, the CPU 107 controls the resonance frequency f of the power transmission antenna 106 in the power transmission apparatus 100 so as to be equal to 13.56 MHz.

(Example of NDEF Message Information for Authentication)

Figure 5:
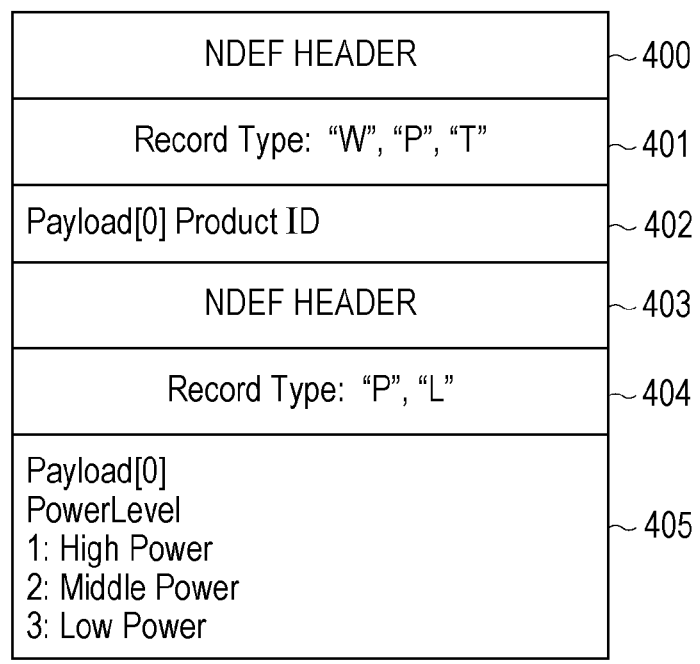
FIG. 5 is a diagram illustrating an example of NDEF message information for authentication.

FIG. 5 is a diagram illustrating an example of NDEF message information for use in device authentication in wireless power transmission, wherein this NDEF message information for authentication is stored in the ROM 207 or the RAM 208 of the electronic device 200 according to the first embodiment. As shown in FIG. 5, the NDEF message information for authentication includes an NDEF record in which an NDEF header 400, a record type 401, and a payload 402 are described for authenticating that the electronic device 200 is a valid device having a wireless power transmission capability.

The NDEF header 400 includes information indicating a start or an end of the NDEF message and information indicating a payload length. The record type 401 represents a type of the NDEF record. In the first embodiment, the record type 401 is character string information including "W", "P", "T" indicating that this NDEF record is for use in authenticating that the device of interest is a valid device having the wireless power transmission capability. The payload 402 indicates a product ID which is an ID uniquely assigned to each valid device having the wireless power transmission capability. The power transmission apparatus 100 acquires, via NFC communication, the NDEF record (the NDEF header 400, the record type 401, the payload 402) in the NDEF message information for authentication stored in the electronic device 200 thereby authenticating whether the electronic device 200 has the wireless power transmission capability.

In the NDEF message information for authentication, the NDEF header 403, the record type 404, and the payload 405 are described in the NDEF record for indicating a power level that can be received by the device having the wireless power transmission capability.

The NDEF header 403 includes information indicating a start or an end of an NDEF message and information indicating a payload length. The record type 404 indicates a type of the NDEF record. In the first embodiment, the record type 404 is character string information including "P," "L" representing that this NDEF record is for indicating a power level that can be received by the device having the wireless power transmission capability.

The payload 405 indicates a power level receivable by the device having the wireless power transmission capability. In a case where the payload 405 is "1", this indicates that the receivable power level is a high power level, while when the payload 405 is "2", this indicates that the receivable power level is a middle power level. In a case where payload 405 is "3", this indicates that the receivable power level is a low power level. The power level is information indicating one of power ranges defined depending on maximum power that can be received by a device having the wireless power transmission capability (hereinafter such maximum power will be referred to as maximum allowable reception power). The power levels are defined, for example, such that a high power level is in a power range up to 10 W, a middle power level is in a power range up to 5 W, a low power level is in a power range up to 1 W, or the like. The power transmission apparatus 100 reads, via NFC communication performed by the NFC communication unit 105, the NDEF record (the NDEF header 403, the record type 404, and the payload 405) in the NDEF message information for authentication stored in the electronic device 200. Thus the power transmission apparatus 100 can acquire information on the power level (maximum allowable reception power) of the electronic device 200.

Figure 6:
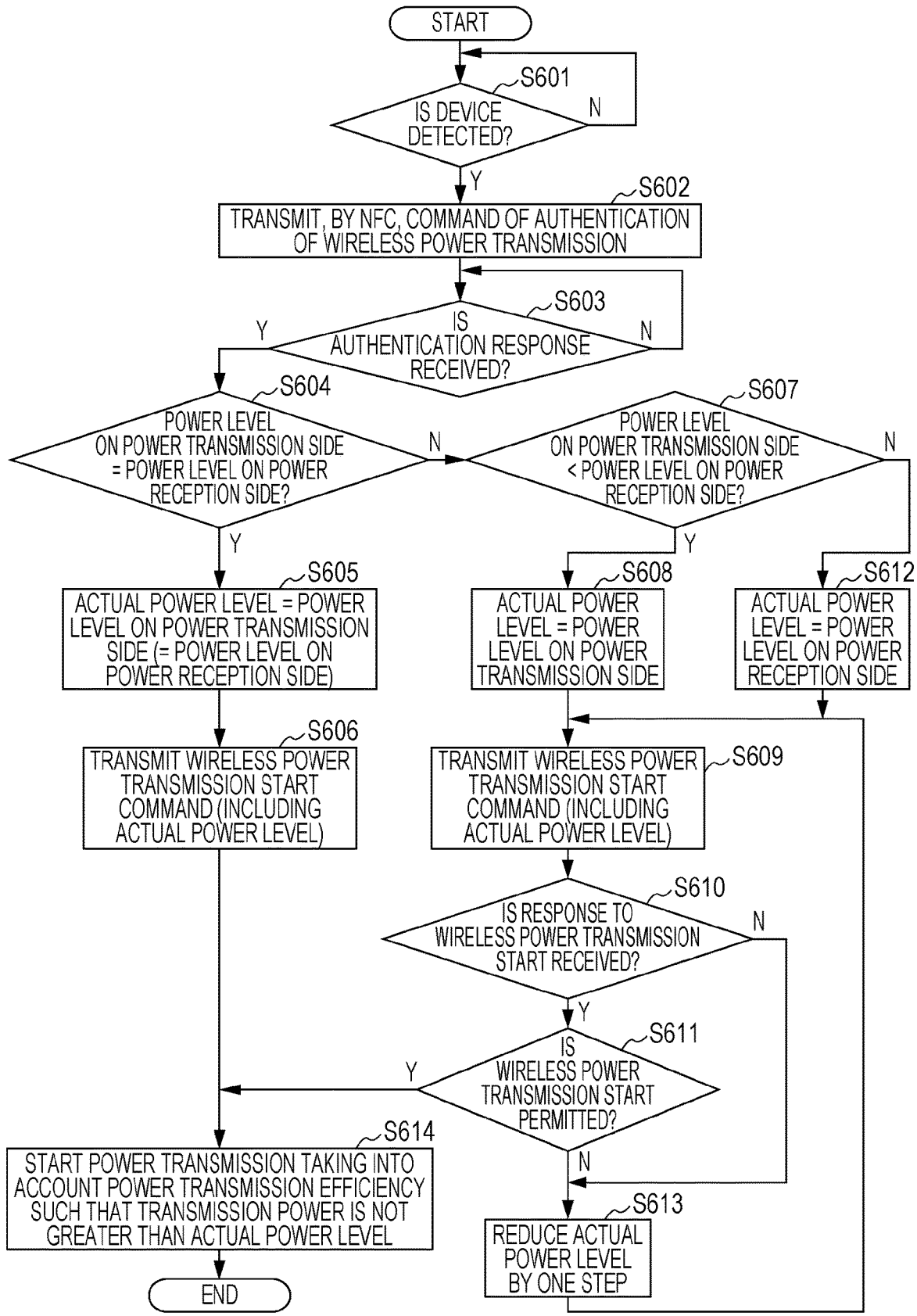
FIG. 6 is a flow chart illustrating a processing procedure performed by a power transmission apparatus to determine an amount of transmission power.

Procedure Performed by Power Transmission Apparatus 100 to Determine Transmission Power FIG. 6 is a flow chart of a processing procedure performed by the power transmission apparatus 100 to determine a magnitude of transmission power (hereafter referred to as an actual power level) according to the first embodiment. The process shown in FIG. 6 is performed by the power transmission apparatus 100 when the power switch disposed in the operation unit 111 of the power transmission apparatus 100 is turned on by a user and when the power transmission apparatus 100 goes to a state in which the power transmission apparatus 100 is allowed to transmit power. A program for controlling the process shown in this flow chart is executed by the CPU 107, wherein the program is stored in the ROM 108.

When the power is turned on, then in S601, the CPU 107 detects whether the distance between the power transmission apparatus 100 and the electronic device 200 is within a predetermined range. In this process, the CPU 107 controls the oscillator 102, the power generation unit 103 and the matching circuit 104 so as to output communication power. In a method of the detection, the CPU 107 acquires, from the analog-to-digital converter 310, a value of the amplitude voltage V1 of the travelling wave detected by the detection unit 113, and acquires, from the analog-to-digital converter 311, a value of the amplitude voltage V2 of the reflected wave of the voltage travelling wave. The CPU 107 periodically calculates VSWR based on the acquired amplitude voltage V1 of the travelling wave and the amplitude voltage V2 of the reflected wave. The CPU 107 determines whether the electronic device 200 exists within the predetermined range based on the calculated value of VSWR. In the determination, in a case where the calculated value of VSWR is equal to or larger than a predetermined value, the CPU 107 determines that the electronic device 200 exists within the predetermined range. Conversely, in a case where the calculated value of VSWR is smaller than the predetermined value, the CPU 107 determines that the electronic device 200 does not exist within the predetermined range.

In S601, in a case where the CPU 107 determines from the calculated value of VSWR that the electronic device 200 does not exist within the predetermined range, the processing flow waits for a predetermined period and then returns to S601 to repeat the process. In a case where the CPU 107 determines in S601 from the calculated value of VSWR that the electronic device 200 exists within the predetermined range, the processing flow proceeds to S602.

In S602, according to the authentication program stored in the ROM 108, the CPU 107 generates an ASK-modulation signal using the NFC communication unit 105, and receives a load-modulation signal thereby performing a device authentication process according to ISO14443-3, ISO18092, NFCDigital Protocol, or the like. For example, in S602, the CPU 107 controls the NFC communication unit 105 to go into an NFC reader/writer mode, and transmits a command to read NDEF message information for authentication such as that shown in FIG. 5 stored in the electronic device 200. Note that in the first embodiment, it is assumed by way of example that in the NFC communication, the power transmission apparatus 100 operates in the NFC reader/writer mode, and the electronic device 200 operates in the NFC card emulation mode. Alternatively, the power transmission apparatus 100 and the electronic device 200 may both operate in a P2P mode in the NFC communication.

Next, the CPU 107 waits in S603 until the CPU 107 receives NDEF message information for authentication stored in the electronic device 200. In a case where NDEF message information for authentication is received, it is stored in the RAM 109. In this case, the CPU 107 checks the record type 401 and the payload 402 in the NDEF message stored in the electronic device 200.

For example, the CPU 107 confirms that the record type 401 is "W", "P", "T", and that the payload 402 indicates a registered product ID. When the confirmation described above is successful, it is determined that the electronic device 200 is a valid device having the wireless power transmission capability, and the processing flow proceeds to S604.

Next, in S604, the CPU 107 makes a comparison between a transmission-side power level that can be transmitted from the power transmission apparatus 100 and a reception-side power level that can be received by the electronic device 200. Note that the information on the transmission-side power level that can be transmitted from the power transmission apparatus 100 is stored in advance in the ROM 108 or the RAM 109. The reception-side power level that can be received by the electronic device 200 can be determined from the NDEF header 403, the record type 404, and the payload 405 in the NDEF message information for authentication. The transmission-side power level and the reception-side power level are classified into a plurality of ranges, for example, a high power level, a middle power level, and a low power level depending on the maximum allowable reception power of a valid device having the wireless power transmission capability.

In S604, the CPU 107 compares the transmission-side power level with the reception-side power level. If they are the same (for example, if they are both the high power level), the processing flow proceeds to S605. In S605, the CPU 107 determines the transmission-side power level as the actual power level. For example, in a case where the transmission-side power level and the reception-side power level are both the high power level, the CPU 107 determines the actual power level as the high power level. After the actual power level is determined in S605, the processing flow proceeds to S606.

Next, in S606, the CPU 107 controls the NFC communication unit 105 to transmit a wireless power transmission start command to the electronic device 200. The wireless power transmission start command is an NDEF message and includes actual power level information determined in S605. After transmitting the wireless power transmission start command to the electronic device 200, the processing flow proceeds to S614.

Next, in S614, the CPU 107 starts power transmission while controlling the magnitude of the power generated by the power generation unit 103 by adjusting the amplifier voltage of the power generation unit 103 such that the magnitude of the transmission power does not exceed the actual power level. For example, in a case where it is determined in S605 that the actual power level is a high power level, the CPU 107 performs power transmission while controlling the magnitude of the transmission power such that it does not exceed 10 W which is the maximum value of a high power level.

In S614, the CPU 107 may adjust the magnitude of the transmission power taking into account a power transmission efficiency from the power transmission apparatus 100 to the electronic device 200 such that the power charged in the electronic device 200 does not exceed the actual power level. For example, in a case where it is determined that the actual power level is a middle power level, then in S614, it is assumed that the power transmission efficiency from the power transmission apparatus 100 to the electronic device 200 is, for example, 50%, and the transmission power is controlled such that the power charged in the electronic device 200 does not exceed 5 W which is the maximum value of a middle power level. That is, CPU 107 controls the magnitude of the transmission power in the power transmission such that the magnitude of the transmission power does not exceed 5 W×2=10 W.

In a case where the comparison in S604 indicates that the transmission-side power level and the reception-side power level are different, the process flow proceeds to S607. In S607, the CPU 107 determines whether the reception power level is larger than the transmission power level. In a case where the reception power level is larger than the transmission power level, the processing flow proceeds to S608.

However, in a case where the reception power level is not larger than the transmission power level, the processing flow proceeds to S612.

In S608, the CPU 107 determines that the actual power level=the transmission-side power level. On the other hand, in S612, the CPU 107 determines that the actual power level=the reception-side power level.

For example, in a case where transmission-side power level is a middle power level, and the reception-side power level is a high power level, the CPU 107 determines that the actual power level is a middle power level. In a case where the transmission-side power level is a high power level, and the reception-side power level is a middle power level, the CPU 107 determines that the actual power level is a middle power level. After the actual power level is determined in S608 or S612, the processing flow proceeds to S609.

Next, in S609, the CPU 107 controls the NFC communication unit 105 to transmit a wireless power transmission start command to the electronic device 200. The wireless power transmission start command is an NDEF message and includes actual power level information determined in S608 or S612. When the wireless power transmission start command is received, the CPU 206 of the electronic device 200 makes a determination, taking into information associated with the battery 212 input from the charge control unit 211, the temperature of the main part of the electronic device 200, and the like, as to whether it is allowed to perform charging with the actual power level without having a problem. The CPU 206 transmits, to the power transmission apparatus 100 via the NFC communication unit 204, a wireless power transmission start response indicating whether the start of the wireless transmission is permitted or not permitted.

Next, in S610, the CPU 107 waits until a wireless power transmission start response is received from the electronic device 200 in response to the wireless power transmission start, command transmitted in S609 to the electronic device 200. In a case where a wireless power transmission start response is received from the electronic device 200, the processing flow proceeds to S611. On the other hand, in a case where in S610, the CPU 107 has not received a wireless power transmission start response from the electronic device 200 within a predetermined period, the processing flow proceeds to S613.

In S611, the CPU 107 checks the wireless power transmission start response received as an NDEF message. The CPU 107 then determines from the wireless power transmission start, response whether the power transmission with the actual power level is permitted. In a case where the CPU 107 determines, from the wireless power transmission start response received from the electronic device 200, that the power transmission with the actual power level is permitted, the processing flow proceeds to S614 described above. On the other hand, in a case where the CPU 107 determines, from the wireless power transmission start response received from the electronic device 200, that the power transmission with the actual power level is not permitted, the processing flow proceeds to S613.

In S613, the CPU 107 reduces the actual power level by one step from the value included in the wireless power transmission start command transmitted in S609, and the processing flow returns to S609. The CPU 107 transmits, to the electronic device 200 via the NFC communication unit 105, a wireless power transmission start command including information indicating the actual power level reduced by one step.

For example, in S609, the CPU 107 transmits to the electronic device 200 the wireless power transmission start command including information indicating that the actual power level is a middle power level. Thereafter, the processing flow proceeds to S611. In a case where the CPU 107 determines in S611 that the power transmission with a middle power level is not permitted, then in S613, the CPU 107 changes the actual power level to a low power level. Thereafter, the processing flow returns to S609, in which the CPU 107 again transmits, to the electronic device 200 via the NFC communication unit 105, the wireless power transmission start command.

Note that in the example shown in FIG. 6, when the transmission-side power level and the reception-side power level are the same, the wireless power transmission start command is transmitted to the electronic device 200 and the power transmitted is started. Alternatively, even when the transmission-side power level and the reception-side power level are the same, the actual power level may be reduced depending on the wireless power transmission start response. In this case, after S606, the same process as S610 is performed to receive a wireless power transmission start response, and if it indicates that the start of wireless power transmission is permitted, then the processing flow proceeds to S614. On the other hand, in a case where a wireless power transmission start response is not received, or in a case where although a wireless power transmission start response is received, the start of wireless power transmission is not permitted, a process similar to S613 may be performed and then the processing flow may return to S606.

After the power transmission is started, the CPU 107 receives via the NFC communication unit 105 status exchange NDEF message information from the electronic device 200 periodically at predetermined intervals. Alternative, after the power transmission is started, in S614, the CPU 107 may adjust the interval of the communication performed by the NFC communication unit 105 depending on the actual power level. More specifically, the CPU 107 may perform the adjustment such that as the actual power level is high, the interval of the communication performed by the NFC communication unit 105 is reduced more thereby increasing safety. In this case, after the power transmission starts, the CPU 107 acquires, via communication using the NFC communication unit 105, information on the battery of the electronic device 200, temperature information, error information, or the like from the electronic device 200. For example, after the power transmission is started, when the actual power level is a high power level, the safety level is low and thus the CPU 107 sets 1 second as the interval of the communication performed by the NFC communication unit 105. In a case where the actual power level is a middle power level, the CPU 107 sets 3 seconds as the interval of the communication performed by the NFC communication unit 105. In a case where the actual power level is a low power level, the safety level is high, and thus the CPU 107 sets 10 seconds as the interval of the communication performed by the NFC communication unit 105.

(Example of Status Exchange NDEF Message Information)

Figure 7:
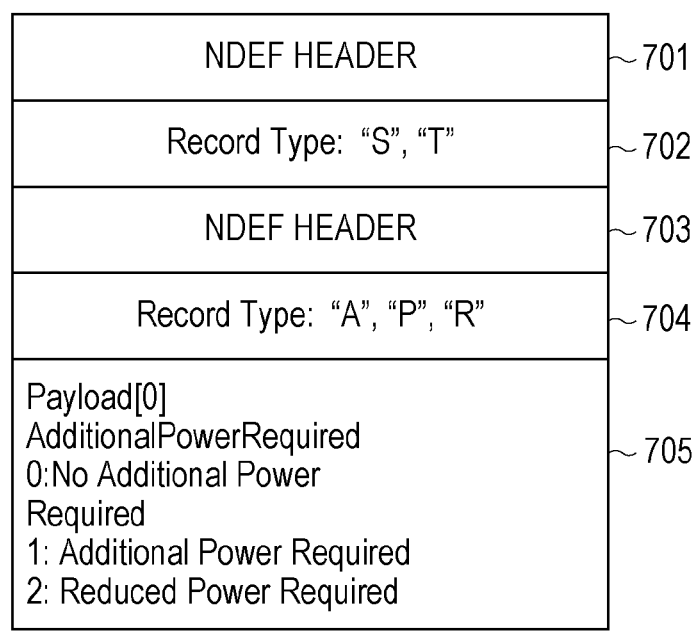
FIG. 7 is a diagram illustrating an example of status exchange NDEF message information according to the first embodiment.

FIG. 7 is a diagram illustrating an example of status exchange NDEF message information stored in the ROM 207 or the RAM 208 of the electronic device 200 according to the first embodiment. In the status exchange NDEF message information, as shown in FIG. 7, an NDEF header 701 and a record type 702 are described in an NDEF record to indicate the status of the electronic device 200.

The NDEF header 701 includes information indicating a start or an end of an NDEF message and information indicating a payload length. The record type 702 indicates a type of the NDEF record. In the first embodiment, the record type 702 is character string information of "S", "T" representing that this NDEF record is for indicating the status of the electronic device 200. The power transmission apparatus 100 acquires via NFC communication the NDEF record (the NDEF header 701 and the record type 702) in the status exchange NDEF message information stored in the electronic device 200. Thus the power transmission apparatus 100 can detect that NDEF information will follow that indicates the status of the electronic device 200.

The status exchange NDEF message information includes the NDEF record for use by a device having the wireless power transmission capability to request to increase or reduce the transmission power wherein the NDEF record includes an NDEF header 703, a record type 704, and a payload 705.

The NDEF header 703 includes information indicating a start or an end of an NDEF message and information indicating a payload length. The record type 704 indicates a type of the NDEF record. In the first embodiment, the record type 704 is character string information of "A", "P", "R" indicating that this NDEF record is for use by a device having the wireless power transmission capability to request an increase/decrease in transmission power.

The payload 705 indicates whether maintaining in the current transmission power level or an increase or reduction from the current transmission power level is requested by a device having the wireless power transmission capability. In a case where the payload 705 is "0", this indicates that maintaining in the current transmission power level is requested by the device having the wireless power transmission capability. In a case where the payload 705 is "1", this indicates that an increase from the current transmission power level is requested by the device having the wireless power transmission capability. In a case where the payload 705 is "2", this indicates that a reduction from the current transmission power level is requested by the device having the wireless power transmission capability.

The power transmission apparatus 100 acquires via NFC communication the NDEF record (the NDEF header 703, the record type 704, and the payload 705) in the status exchange NDEF message information stored in the electronic device 200. Thus the power transmission apparatus 100 can acquire a request to increase or reduce transmission power from the electronic device 200.

Figure 8:
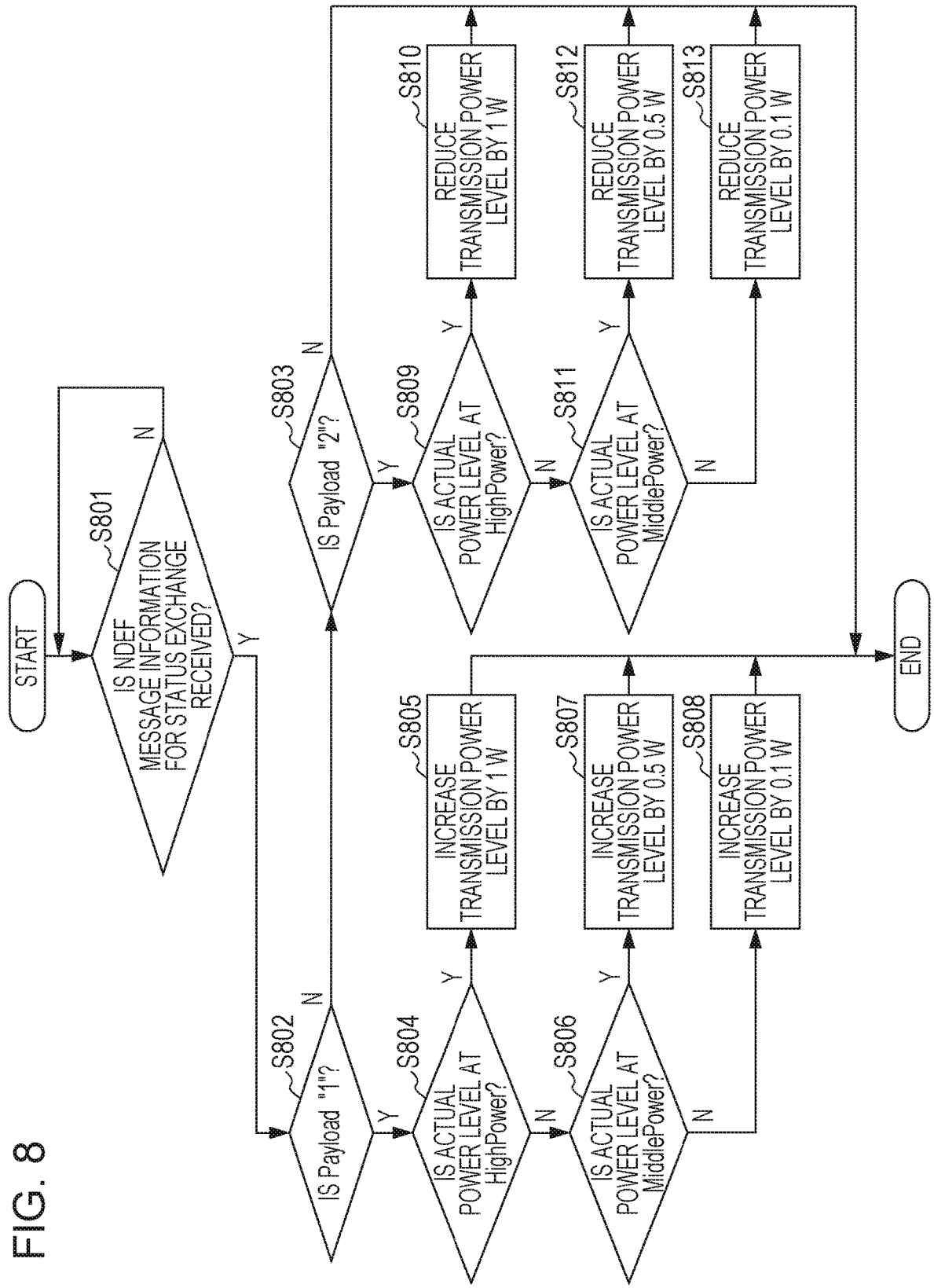
FIG. 8 is a flow chart illustrating a processing procedure performed by a power transmission apparatus to determine an amount of an increase or reduction in transmission power according to the first embodiment.

Procedure Performed by Power Transmission Apparatus 100 to Adjust Transmission Power According to First Embodiment FIG. 8 is a flow chart of a processing procedure performed by the power transmission apparatus 100 to determine an amount of an increase/decrease in transmission power according to the first embodiment. The process shown in FIG. 8 is performed by the power transmission apparatus 100 after the power transmission apparatus 100 determines the actual power level according to the flow chart shown in FIG. 6 and starts power transmission. The program for controlling the process shown in this flow chart is executed by the CPU 107, wherein the program is stored in the ROM 108.

In S801, the CPU 107 waits until status exchange NDEF message information stored in the electronic device 200 is received via the NFC communication unit 105. In a case where status exchange NDEF message information is received from the electronic device 200, the CPU 107 stores the received status exchange NDEF message information in the RAM 109. Furthermore, the CPU 107 confirms that the record type 702 in the received status exchange NDEF message information indicates that the record indicates status information of the electronic device 200. The processing flow waits in S801 until this confirmation is completed. After the confirmation is completed, the processing flow proceeds to S802.

Next, in S802, the CPU 107 confirms that the record type 704 indicates "A", "P", "R". Furthermore, the CPU 107 determines whether the payload 705 is "1". In a case where the result of the determination indicates that the payload 705 is "1", the processing flow proceeds to S804, but otherwise the processing flow proceeds to S803.

In S804, the CPU 107 determines whether the actual power level is set to a high power level (the electronic device 200 is capable of receiving power up to 10 W) via the procedure shown in FIG. 6. In a case where the result of the determination indicates that the actual power level is set to a high power level, the processing flow proceeds to S805, but otherwise the processing flow proceeds to S806.

In S805, the CPU 107 adjusts the amplifier voltage of the power generation unit 103 such that the transmission power generated by the power generation unit 103 is increased by 1 W from the current transmission power, and the ends the process.

On the other hand, in S806, the CPU 107 determines whether the actual power level is set to a middle power level (the electronic device 200 is capable of receiving power up to 5 W) via the procedure shown in FIG. 6. In a case where the result of the determination indicates that the actual power level is set to a middle power level, the processing flow proceeds to S807, but otherwise the processing flow proceeds to S808.

In S807, the CPU 107 adjusts the amplifier voltage of the power generation unit 103 such that the transmission power generated by the power generation unit 103 is increased by 0.5 W from the current transmission power, and the ends the process. On the other hand, in S808, the CPU 107 adjusts the amplifier voltage of the power generation unit 103 such that the transmission power generated by the power generation unit 103 is increased by 0.1 W from the current transmission power, and the ends the process.

In S803, the CPU 107 confirms that the record type 704 indicates "A", "P", "R". The CPU 107 then determines whether the payload 705 is "2". In a case where the result of the determination indicates that the payload 705 is "2", the processing flow proceeds to S809, but otherwise the process is ended.

In S809, the CPU 107 determines whether the actual power level is set to a high power level (the electronic device 200 is capable of receiving power up to 10 W) via the procedure shown in FIG. 6. In a case where the result of the determination indicates that the actual power level is set to a high power level, the processing flow proceeds to S810, but otherwise the processing flow proceeds to S811.

In S810, the CPU 107 adjusts the amplifier voltage of the power generation unit 103 such that the transmission power generated by the power generation unit 103 is reduced by 1 W from the current transmission power, and the ends the process.

On the other hand, in S811, the CPU 107 determines whether the actual power level is set to a middle power level (the electronic device 200 is capable of receiving power up to 5 W) via the procedure shown in FIG. 6. In a case where the result of the determination indicates that the actual power level is set to a middle power level, the processing flow proceeds to S812, but otherwise the processing flow proceeds to S813.

In S812, the CPU 107 adjusts the amplifier voltage of the power generation unit 103 such that the transmission power generated by the power generation unit 103 is reduced by 0.5 W from the current transmission power, and the ends the process. On the other hand, in S813, the CPU 107 adjusts the amplifier voltage of the power generation unit 103 such that the transmission power generated by the power generation unit 103 is reduced by 0.1 W from the current transmission power, and the ends the process.

According to the first embodiment, as described above, the power transmission apparatus 100 is capable of properly determining the amount of an increase or decrease in transmission power in response to a transmission power increase/decrease request depending on the actual power level determined based on the power level that a power reception device, i.e., the electronic device 200, can receive.

Second Embodiment

Next, a second embodiment is described below. Note that configurations of the power transmission apparatus 100 and the electronic device 200 and a process of determining the actual power level are similar to those according to the first embodiment, and thus a further description thereof is omitted. The following description given with reference to drawings will focus on differences from the first embodiment.

(Examples of Status Exchange NDEF Message Information)

Figure 9:
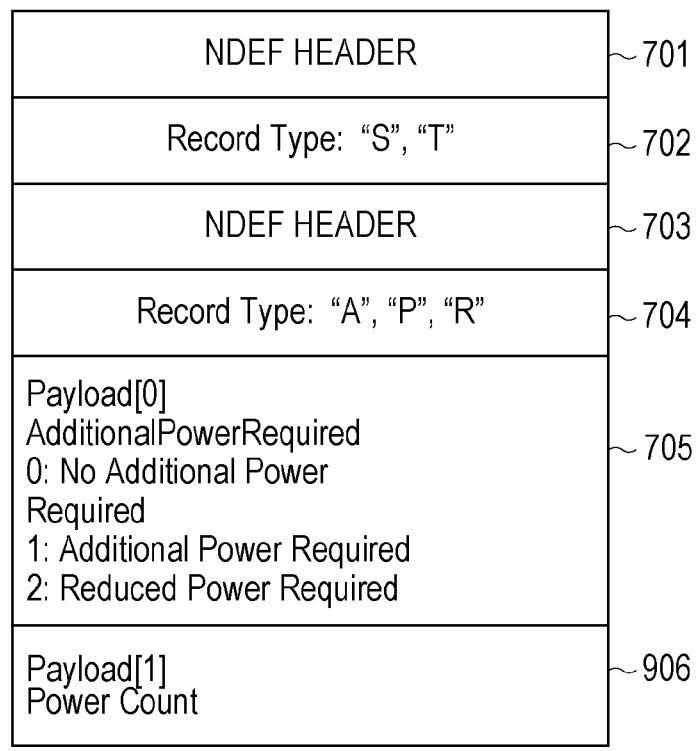
FIG. 9 is a diagram illustrating an example of status exchange NDEF message information according to a second embodiment.

FIG. 9 is a diagram illustrating an example of status exchange NDEF message information stored in the ROM 207 or the RAM 208 of the electronic device 200 according to the second embodiment. In the status exchange NDEF message information shown in FIG. 9, an NDEF header 701, a record type 702, an NDEF header 703, a record type 704 and a payload 705 are similar to those shown in FIG. 7, and thus a further description thereof is omitted.

In FIG. 9, the NDEF header 703, the record type 704, the payload 705, and a payload 906 are described in an NDEF record for use by a device having the wireless power transmission capability to request an increase or reduction in transmission power.

The payload 906 indicates an increase count or a reduction count (the number of increase or reduction steps) of transmission power requested by a device having the wireless power transmission capability. For example, in a case where the payload 905 is "1" and the payload 906 is "5", this indicates that an increase in transmission power by 5 counts from the current transmission power is requested by the device having the wireless power transmission capability. In a case where the payload 905 is "2" and the payload 906 is "3", this indicates that a reduction in transmission power by 3 counts from the current transmission power is requested by the device having the wireless power transmission capability. The power transmission apparatus 100 acquires via NFC communication the NDEF record (the NDEF header 703, the record type 704, the payload 705, and the payload 906) in the status exchange NDEF message information stored in the electronic device 200. Thus the power transmission apparatus 100 can acquire a request to increase or reduce transmission power from the electronic device 200 together with information on the amount of increase/reduction expressed in counts.

Figure 10:
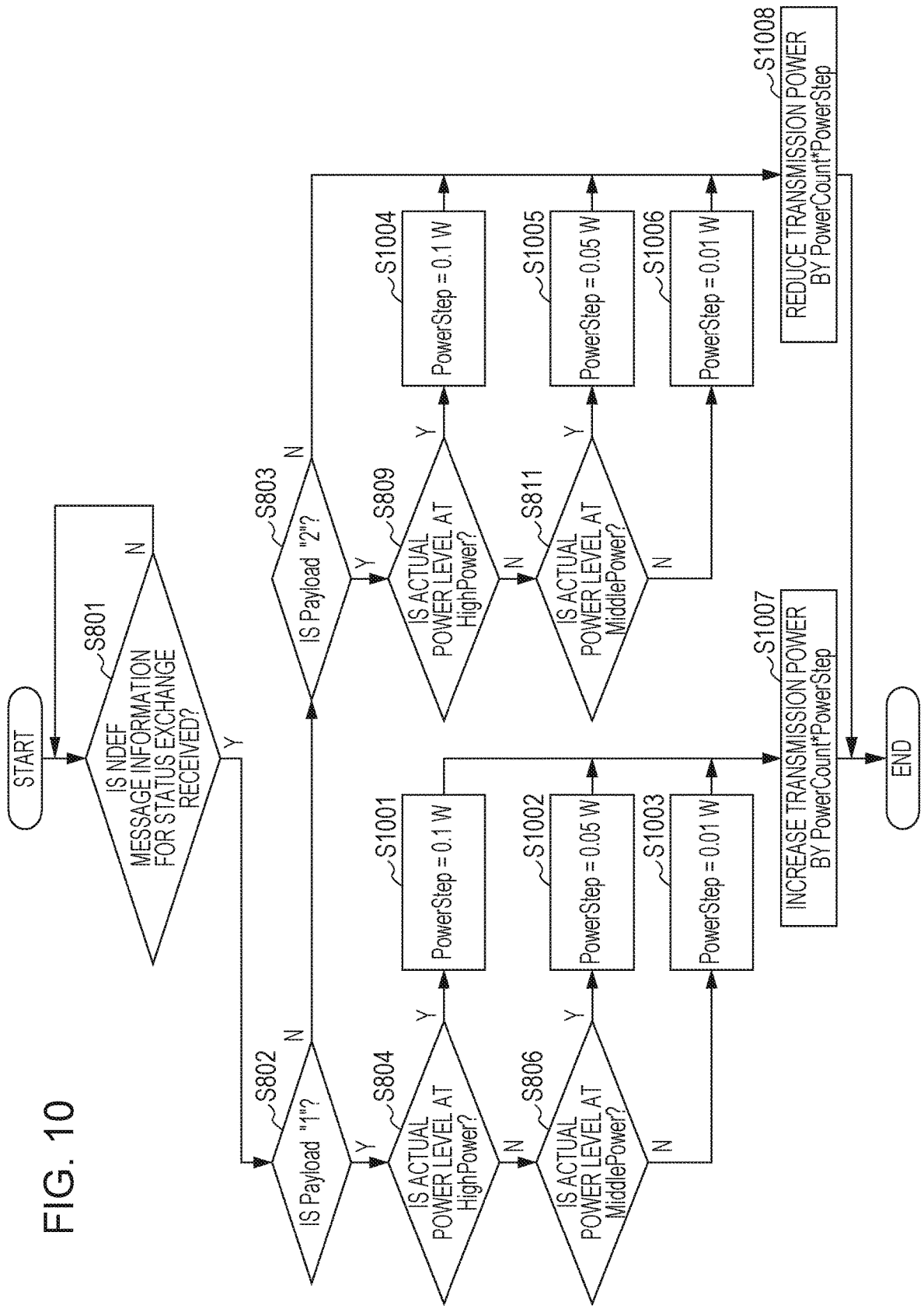
FIG. 10 is a flow chart illustrating a processing procedure performed by a power transmission apparatus to determine an amount of an increase or reduction in transmission power according to the second embodiment.

Procedure Performed by Power Transmission Apparatus 100 to Adjust Transmission Power According to Second Embodiment FIG. 10 is a flow chart of a processing procedure performed by the power transmission apparatus 100 to determine an amount of an increase/decrease in transmission power according to the second embodiment. The process shown in FIG. 10 is performed by the power transmission apparatus 100 after the power transmission apparatus 100 determines the actual power level according to the flow chart shown in FIG. 6 and starts power transmission. A program for controlling the process shown in this flow chart is executed by the CPU 107, wherein the program is stored in the ROM 108. Similar processing steps to those shown in FIG. 8 are denoted by similar reference symbols, and a further description thereof is omitted. The following description will focus on differences from processes shown in FIG. 8.

In a case where a result of determination in S804 indicates that the CPU 107 has set the actual power level to a high power level (the electronic device 200 is capable of receiving power up to 10 W), the processing flow proceeds to S1001. In S1001, the CPU 107 sets the transmission power increase unit (power step) to 0.1 W. The processing flow then proceeds to S1007.

In a case where the result of the determination in S806 indicates that the CPU 107 has set the actual power level to a middle power level (the electronic device 200 is capable of receiving power up to 5 W), the processing flow proceeds to S1002, but otherwise the processing flow proceeds to S1003.

In S1002, the CPU 107 sets the transmission power increase unit (power step) to 0.05 W. The processing flow then proceeds to S1007. On the other hand, in S1003, the CPU 107 sets the transmission power increase unit (power step) to 0.01 W. The processing flow then proceeds to S1007.

In a case where the result of the determination in S809 indicates that the CPU 107 has set the actual power level to a high power level (the electronic device 200 is capable of receiving power up to 10 W), the processing flow proceeds to S1004. In S1004, the CPU 107 sets the transmission power increase unit (power step) to 0.1 W. The processing flow then proceeds to S1008.

In a case where the result of the determination in S811 indicates that the CPU 107 has set the actual power level to a middle power level (the electronic device 200 is capable of receiving power up to 5 W), the processing flow proceeds to S1005, but otherwise the processing flow proceeds to S1006.

In S1004, the CPU 107 sets the transmission power reduction unit (power step) to 0.05 W. The processing flow then proceeds to S1008. On the other hand, in S1006, the CPU 107 sets the transmission power reduction unit (power step) to 0.01 W. The processing flow then proceeds to S1008.

In S1007, the CPU 107 determines the amount of an increase in transmission power so as to be equal to the product of the transmission power increase count (power count) specified by the payload 906 and the transmission power increase unit (power step). The CPU 107 then adjusts the amplifier voltage of the power generation unit 103 such that the transmission power generated by the power generation unit 103 is increased by the determined amount from the current transmission power, and the ends the process.

For example, in a case where the actual power level is a high power level, the payload 905 is "1", and the payload 906 is "3", then the transmission power increase amount is determined as transmission power increase count (3)×transmission power increase unit (0.1 W)=0.3 W. For example, in a case where the actual power level is a low power level, the payload 905 is "1", and the payload 906 is "2", the transmission power increase amount is determined as transmission power increase count (2)×transmission power increase unit (0.01 W)=0.02 W.

On the other hand, in S1008, the CPU 107 determines the transmission power increase amount so as to be equal to the product of the transmission power reduction count (power count) specified in the payload 906 and the transmission power reduction unit (power step). The CPU 107 then adjusts the amplifier voltage of the power generation unit 103 such that the transmission power generated by the power generation unit 103 is reduced by the determined amount from the current transmission power, and the ends the process.

In a case where the actual power level is a middle power level, the payload 905 is "2", and the payload 906 is "5", then the transmission power reduction amount is determined as transmission power reduction count (5)×transmission power reduction unit (0.05 W)=0.25 W. For example, in a case where the actual power level is a low power level, the payload 905 is "2", and the payload 906 is "4", the transmission power reduction amount is determined as transmission power reduction count (4)×transmission power reduction unit (0.01 W)=0.04 W.

According to the second embodiment, as described above, the power transmission apparatus 100 is capable of more properly determining the amount of an increase or decrease in transmission power in response to a transmission power increase/decrease request depending on the actual power level determined based on the power level that a power reception device, i.e., the electronic device 200, can receive.

Modifications to First and Second Embodiments

In the first and second embodiments, it is assumed by way of example that the power transmission apparatus 100 and the electronic device 200 perform wireless communication according to the NFC standard. However, the power transmission apparatus 100 and the electronic device 200 may perform near-distance wireless communication according to a wireless communication standard other than the NFC standard. Instead of NFC standard, the power transmission apparatus 100 and the electronic device 200 may employ the FeliCa(registered trademark) standard in wireless communication.

Instead of NFC standard, the power transmission apparatus 100 and the electronic device 200 may employ the RFID (Radio Frequency IDentification standard in wireless communication. Instead of NFC standard, the power transmission apparatus 100 and the electronic device 200 may employ the MIFARE(registered trademark) standard (ISO/IEC 14443) in wireless communication. Instead of NFC standard, the power transmission apparatus 100 and the electronic device 200 may employ the TransferJet(registered trademark) standard in wireless communication.

In the first and second embodiments described above, to achieve resonance between the power transmission apparatus 100 and the electronic device 200, the resonance frequency and the power transmission antenna 106 and the resonance frequency of the power reception antenna 201 are set to, by way of example, 13.56 MHz. However, the resonance frequency is not limited to 13.56 MHz. For example, in a case where the power transmission apparatus 100 and the electronic device 200 performs wireless communication not according to the NFC standard but according to the TransferJet standard, the resonance frequency and the power transmission antenna 106 and the resonance frequency of the power reception antenna 201 are set to 4.48 GHz. In a case where the power transmission apparatus 100 performs wireless power transmission not based on the magnetic resonance but based on the Qi standard, the resonance frequency and the power transmission antenna 106 and the resonance frequency of the power reception antenna 201 may be set to a value in a range from 100 kHz to 250 kHz. The resonance frequency and the power transmission antenna 106 and the resonance frequency of the power reception antenna 201 may be set to 6.78 MHz or a frequency lower than several hundred kHz.

In the first and second embodiments described above, the wireless communication unit 112 and the wireless communication unit 218 perform communication according to, by way of example, wireless LAN standard. However, the communication is not limited to that according to the wireless LAN standard. For example, the wireless communication unit 112 and the wireless communication unit 218 may perform wireless communication not according to the wireless LAN standard but according to the Blue Tooth (registered trademark) standard.

Alternatively, for example, the wireless communication unit 112 and the wireless communication unit 218 may perform wireless communication not according to the wireless LAN standard but according to the WirelessHD(registered trademark) standard. Alternatively, for example, the wireless communication unit 112 and the wireless communication unit 218, may perform wireless communication not according to the wireless LAN standard but according to the WHDI(registered trademark) standard.

Alternatively, for example, the power transmission apparatus 100 may include a wired communication unit instead of the wireless communication unit 112, and the electronic device 200 may include a wired communication unit instead of the wireless communication unit 218. In this case, the wired communication unit in the power transmission apparatus 100 and the wired communication unit in the electronic device 200 may perform communication according to the HDMI (High-Definition Multimedia Interface) (registered trademark) standard. Alternatively, the wired communication unit in the power transmission apparatus 100 and the wired communication unit in the electronic device 200 may perform communication according to the Display Port (registered trademark) standard.

Third Embodiment

Various functions, processes, and methods according to the first and second embodiments described above may be realized by a personal computer, a microcomputer, a CPU (Central Processing Unit), or the like using a program. In a third embodiments described above, the personal computer, the microcomputer, the CPU or the like will be generically referred to as a "computer X". Furthermore, in the third embodiment, a program for controlling the computer X to realize various functions, processes, and methods according to the first and second embodiments described above will be referred to as a "program Y".

The various functions, the processes, and the methods according to the first and second embodiments described above may be realized by the computer X by executing the program Y. In this case, the program Y may be supplied to the computer X via a computer-readable storage medium. In the third embodiment, the computer-readable storage medium may include at least one of the following: a hard disk apparatus; a magnetic storage apparatus; an optical storage apparatus; a magnetooptical storage apparatus; a memory card; a volatile memory; a nonvolatile memory; and the like. Note that the computer-readable storage medium according to the third embodiment is a non-transitory storage medium.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed. exemplary embodiments. The scope of the following claims is to be accorded the broadest interpretation so as to encompass all such modifications and equivalent structures and functions.

This application claims the benefit of Japanese Patent Application No. 2015-213097, filed Oct. 29, 2015, which is hereby incorporated by reference herein in its entirety.

The invention claimed is:

1. A power transmission apparatus comprising:
a power transmission unit configured to contactlessly transmit power to an electronic device;
a communication unit configured to communicate with the electronic device; and
a control unit,
wherein the control unit acquires information on a power level receivable by the electronic device via the communication unit,
wherein in a case where an instruction for increasing or reducing the power transmitted from the power transmission unit is received from the electronic device via the communication unit, the control unit changes the power transmitted from the power transmission unit, and
wherein an amount of the power changed by the control unit at a time according to the instruction varies depending on the power level receivable by the electronic device.

2. The power transmission apparatus according to claim 1, wherein the power level is one of stepwisely classified levels depending on maximum allowable reception power receivable by the electronic device.

3. The power transmission apparatus according to claim 1, wherein the control unit controls the magnitude of the power transmitted from the power transmission unit by adjusting an amplifier voltage.

4. The power transmission apparatus according to claim 1, wherein in a case where a request to increase or reduce power is received from the electronic device via the communication unit, the control unit receives information on the number of increase/reduction steps of power, and the control unit determines an increase/reduction amount per step of the power transmitted by the power transmission unit depending on the determined power thereby determining a power increase/reduction amount.

5. The power transmission apparatus according to claim 1, wherein the control unit transmits, to the electronic device via the communication unit, information associated with power transmitted by the power transmission unit depending on the power level receivable by the electronic device, and
in a case where permission of power is given by the electronic device based on the transmitted information associated with the power, the control unit performs control such that the power is transmitted from the power transmission unit to the electronic device.

6. The power transmission apparatus according to claim 1, wherein the control unit transmits, to the electronic device via the communication unit, information associated with power transmitted by the power transmission unit depending on the power level that can be received by the electronic device, and
in a case where permission of power is not given by the electronic device based on the transmitted information associated with the power, the control unit performs control such that the power transmitted by the power transmission unit is reduced, and information associated with the reduced power is transmitted to the electronic device via the communication unit.

7. The power transmission apparatus according to claim 1, wherein the control unit performs communication with the electronic device via the communication unit periodically at intervals.

8. The power transmission apparatus according to claim 7, wherein depending on the power level, the control unit varies the intervals at which the communication with the electronic device via the communication unit is performed.

9. The power transmission apparatus according to claim 7, wherein the control unit sets the intervals at which the communication with the electronic device via the communication unit is performed such that as the power level is smaller, the intervals is longer.

10. The power transmission apparatus according to claim 1, wherein the control unit performs control such that before power is transmitted to the electronic device by using the power transmission unit, information on a power level receivable by the electronic device is acquired via the communication unit.

11. The power transmission apparatus according to claim 1, wherein the control unit performs control such that the transmission of power by the power transmission unit to the electronic device and the communication via the communication unit to the electronic device are alternately performed.

12. The power transmission apparatus according to claim 1, further comprising an antenna,
wherein the antenna is used in both the transmission of power by the power transmission unit to the electronic device and the communication via the communication unit to the electronic device.

13. The power transmission apparatus according to claim 1, wherein
the communication via the communication unit to the electronic device is communication according to the NFC standard referred to as NFCIP-1 (ISO/IEC 18092) or the NFC standard referred to as NFCIP-2 (ISO/IEC 21481), and
the control unit operates as a reader/writer in the communication via the communication unit to the electronic device.

14. A method of controlling a power transmission apparatus, the power transmission apparatus including a power transmission unit configured to contactlessly transmit power to an electronic device and a communication unit configured to perform communication to the electronic device, the method comprising:
acquiring, via the communication unit, information on a power level receivable by the electronic device; and
in a case where an instruction for increasing or reducing the power transmitted from the power transmission unit is received from the electronic device via the communication unit, changing the power transmitted from the power transmission unit,
wherein an amount of the power changed by the control unit at a time according to the instruction varies depending on the power level receivable by the electronic device.

15. A non-transitory storage medium storing therein a program for causing a power transmission apparatus to execute a control method, the power transmission apparatus including a power transmission unit configured to contactlessly transmit power to an electronic device and a communication unit configured to perform communication to the electronic device, the control method comprising:
acquiring, via the communication unit, information on a power level receivable by the electronic device; and
in a case where an instruction for increasing or reducing the power transmitted from the power transmission unit is received from the electronic device via the communication unit, changing the power transmitted from the power transmission unit,
wherein an amount of the power changed by the control unit at a time according to the instruction varies depending on the power level receivable by the electronic device.

* * * * *